United States Patent

Brooks, Jr. et al.

[11] Patent Number: 5,875,072
[45] Date of Patent: *Feb. 23, 1999

[54] LOW PROFILE HEAD SUSPENSION ASSEMBLY WITH LOAD AND UNLOAD CAPABILITY

[75] Inventors: William Woodrow Brooks, Jr.; Jeffrey Bernard Brown; Jerome Thomas Coffey; Donald John Wanek, all of Rochester, Minn.

[73] Assignee: International Business Machines Corporation, Armonk, N.Y.

[ * ] Notice: The term of this patent shall not extend beyond the expiration date of Pat. No. 5,572,387.

[21] Appl. No.: 939,428

[22] Filed: Sep. 26, 1997

Related U.S. Application Data

[60] Continuation of Ser. No. 662,342, Jun. 12, 1996, abandoned, which is a division of Ser. No. 448,272, May 23, 1995, Pat. No. 5,572,387, which is a division of Ser. No. 221,339, Mar. 31, 1994, abandoned.

[51] Int. Cl.$^6$ .............................. G11B 5/48; G11B 21/16
[52] U.S. Cl. .............................................. 360/104; 360/105
[58] Field of Search .................................... 360/103, 104, 360/105

[56] References Cited

U.S. PATENT DOCUMENTS

| | | | |
|---|---|---|---|
| 3,713,121 | 1/1973 | Fasano et al. | 360/104 |
| 4,206,489 | 6/1980 | Manzke et al. | 360/105 |
| 4,280,156 | 7/1981 | Villette | 360/105 |
| 4,752,848 | 6/1988 | Garcia et al. | 360/105 |
| 4,760,478 | 7/1988 | Pal et al. | 360/104 |
| 4,819,094 | 4/1989 | Oberg | 360/104 |
| 4,933,785 | 6/1990 | Morehouse et al. | 360/78.04 |
| 4,991,045 | 2/1991 | Oberg | 360/104 |
| 5,027,241 | 6/1991 | Hatch et al. | 360/105 |
| 5,057,954 | 10/1991 | O'Sullivan et al. | 360/105 |
| 5,074,029 | 12/1991 | Brooks, Jr. et al. | 29/603.03 |
| 5,187,625 | 2/1993 | Blaser et al. | 360/104 |
| 5,189,575 | 2/1993 | Onooka et al. | 360/105 |
| 5,384,432 | 1/1995 | Noro et al. | 174/117 FF |
| 5,526,205 | 6/1996 | Aoyagi et al. | 360/104 |
| 5,530,606 | 6/1996 | Baasch et al. | 360/104 |
| 5,570,261 | 10/1996 | Frater et al. | 360/104 |
| 5,572,387 | 11/1996 | Brooks, Jr. et al. | 360/104 |

FOREIGN PATENT DOCUMENTS

| 4258856 | 9/1992 | Japan . |
|---|---|---|

*Primary Examiner*—William J. Klimowicz
*Attorney, Agent, or Firm*—Schmeiser, Olsen & Watts

[57] ABSTRACT

A head suspension assembly for use in a disk drive having a load and unload ramp, the head suspension assembly including a load beam, a cover having a load and unload tang, a coating sandwiched between the cover and the load beam, and a head lead wire extending through the coating. In a preferred embodiment, the coating is a visco-elastic thermoplastic adhesive and the cover is a constraining material; whereby the cover is adhered to the load beam and undesired vibrations of the head suspension assembly are dampened. In a method of fabricating the head suspension assembly, the cover is placed over the load beam after the coating is applied and after the head lead wire is strung over the load beam, and then the cover is adhered to the load beam by heating the coating, preferably by placing a heated platen over the cover. Consequently, the load and unload tang, which is part of the cover, is not an obstacle when routing the head lead wire over the load beam and bonding the wire to a slider, and the head suspension assembly fabrication process can be automated.

11 Claims, 8 Drawing Sheets

LOW PROFILE HEAD SUSPENSION ASSEMBLY WITH LOAD AND UNLOAD CAPABILITY

This application is a continuation of application Ser. No. 08/662,342, filed Jun. 12, 1996, now abandoned, which is a Divisional of application Ser. No. 08/448,272, filed May 23, 1995 now U.S. Pat. No. 5,572,387, which is a Divisional of application Ser. No. 08/221,339, filed Mar. 31, 1994, now abandoned.

BACKGROUND OF THE INVENTION

1. Field of the Invention

The present invention relates to head suspension assemblies for use in data storage disk drives, and in particular to low profile head suspension assemblies having load and unload capability, increased vibration damping and improved attachment of head lead wires.

2. Description of the Related Art

As data storage disk drives continue to be reduced in size, the drives are subject to much higher mechanical shock loads than before. Small form factor drives in portable applications, for example are especially subject to damage from being dropped. One of the more difficult types of damage to eliminate is damage to the head and/or data storage disk caused by impact of the head against the disk, often referred to as head/disk slap.

Because a disk drive is more likely to experience a high mechanical shock load when it is not in operation, one conventional method of nearly eliminating head/disk slap damage is to park the head off the disk when the disk drive is not in use. This is conventionally done by the use of a load and unload ramp that a load and unload tang of a head suspension assembly slides along, thereby moving the head between a position on the disk and a position parked off the disk.

One of the major disadvantages of using a conventional load and unload ramp and tang approach is the necessity of making the head suspension assembly by hand. This disadvantage occurs because conventional head suspension assemblies that include a load and unload tang are small and complex in design. Conventionally, the load and unload tang is built into a load beam, i.e., the beam which is used to hold and position the head in close proximity to the disk. Typical examples of this conventional arrangement are described in U.S. Pat. Nos. 5,027,241 and 5,187,625. In such conventional arrangements, the load and unload tang is an obstacle during fabrication of the head suspension assembly, particularly when routing head lead wires over the load beam and bonding the wires to bonding pads on a slider carrying the head. People must do this complex wire routing and bonding by hand, and automation is ruled out.

Also, the head lead wires connected to the slider resist the necessary pitch and roll movement of the slider. Movement of the slider in the pitch and/or roll direction is necessary for the slider to remain at a substantially constant fly height above the surface of the disk. The slider must be free to respond to very minute deviations from a perfect plane as the disk rotates at high speed so that the head can read and write reliably the data on the disk and so that the slider is prevented from impacting the surface of the rotating disk and thus destroying some of the disk surface and any data stored therein. As the air bearing surface features of the slider are reduced in size, the deleterious effect of the wires on the pitch and roll movement of the slider becomes more significant. This restraining influence of the wires on the slider must be minimized, while at the same time the wires must be positioned and restrained so that they resist being pulled from the slider and thus render the head ineffective.

Further, when the head lead wires are connected to the slider by being looped away from the load beam, the wires consume excessive height which defeats efforts to minimize the overall disk drive height.

Still further, as data storage disk drives are reduced in size, the recording density is increased and consequently vibrations of the head suspension assembly tend to become more significant. To insure reliable read/write operations, such vibrations either must be eliminated or must cease prior to any read/write operations. The latter option, however, disadvantageously affects the access speed of the disk drive.

Accommodating all of the foregoing conditions and requirements becomes a significant undertaking when designing the head suspension assembly for a data storage disk drive having load and unload capability.

SUMMARY OF THE INVENTION

An object of the present invention is to provide an enhanced head suspension assembly.

It is another object of the present invention to provide a head suspension assembly having load and unload capability that can be fabricated using an automated process.

It is yet another object of the present invention to provide a head suspension assembly having a load and unload tang, which is not an obstacle during fabrication of the head suspension assembly, particularly when routing the head lead wires over a load beam and bonding the wires to bonding pads on a slider carrying a head.

It is a further object of the present invention to provide an automated process for fabricating a head suspension assembly having load and unload capability.

It is a still further object of the present invention to provide a head suspension assembly having load and unload capability which minimizes the affect of the head lead wires on the flight characteristics of a slider and which strain relieves the wires in order to isolate undesired forces and thus prevent the wires from being separated from bonding pads on the slider.

It is an additional object of the present invention to provide a head suspension assembly having load and unload capability that minimizes the height of head lead wires routed over a load beam and to a slider.

It is still another object of the present invention to provide a head suspension assembly having load and unload capability which improves data access speeds and reliability of a data storage disk drive by damping undesired vibrations of the head suspension assembly.

The foregoing objects and others are accomplished by a head suspension assembly according to the present invention, including a load beam having a first end and a second end, the first end of the load beam being adapted for operable connection to an actuator motor; a flexure supported at the second end of the load beam, the flexure being adapted for receiving a slider; a cover attached to the load beam, the cover having a load and unload tang projecting beyond the load beam so as to be engagable with the load and unload ramp; a coating overlaying a portion of the load beam, a first portion of the coating being sandwiched between the cover and the load beam; and a head lead wire extending through the first portion of the coating, the head lead wire being adapted for bonding to the slider.

For example, because the head lead wire extends through the coating that is sandwiched between the cover and the load beam according to the present invention, the affect of the head lead wire on the flight characteristics of a slider is minimized and the head lead wire is strain relieved and thus is prevented from being separated from the slider.

In a method of fabricating the head suspension assembly according to the present invention, the cover is placed over the load beam after the coating is applied and after the head lead wire are strung over the load beam, and then the cover is adhered to the load beam by heating the coating. In a preferred method of fabricating the head suspension assembly according to the present invention, the head lead wire is additionally laser stripped and bonded or soldered to the slider before the cover is placed over and adhered to the load beam. Consequently, the load and unload tang, which is a part of the cover, is not an obstacle when routing head lead wires over a load beam and bonding the wires to the slider, and the head suspension assembly fabrication process can be automated.

In a preferred embodiment of the present invention, the coating is a visco-elastic material and the cover is a constraining material. Consequently, undesired vibrations of the head suspension assembly are damped, and data access speeds and reliability of a data storage disk drive are improved.

Also, in a preferred embodiment of the present invention, the head lead wire further extends through another portion of the coating so that the head lead wire is retained in a plane substantially parallel to a plane of the load beam, thereby minimizing the height of head lead wire above the load beam.

Any of the above aspects of the present invention may be incorporated into a head suspension assembly, but a preferred embodiment is to incorporate as least one version of each of the aspects briefly described above.

A more complete understanding of the present invention may be had from the drawings and detailed description to follow.

DESCRIPTION OF THE PREFERRED EMBODIMENT

Figure 1:
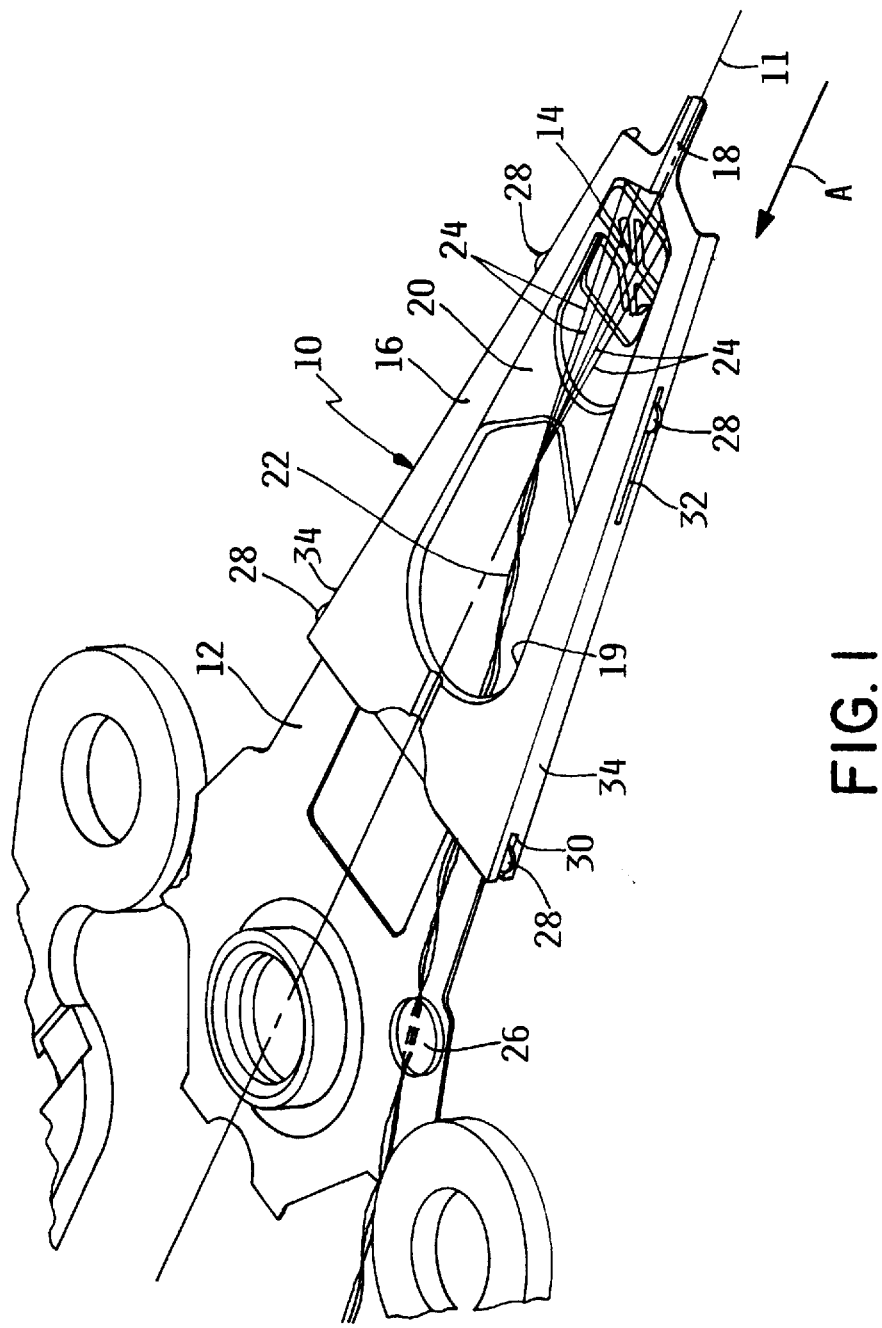
FIG. 1 is an isometric view of an embodiment of a head suspension assembly according the present invention.

FIG. 1 is an isometric view of an embodiment of a head suspension assembly according the present invention. Head suspension assembly 10 includes a load beam 12 having a longitudinal axis 11 and a distal end that supports a flexure 14.

Load beam 12 and flexure 14 may be made of a metal such as stainless steel, and are preferably integrally formed. A slider (not shown) is mounted to flexure 14.

A cover 16 having a load and unload tang 18 is attached to the load beam 12. Preferably, cover 16 has a hole 19 that exposes a portion of load beam 12 and flexure 14. Cover 16 and load and unload tang 18 may be made of a metal such as stainless steel, and are preferably integrally formed together. Alternatively, cover 16 and/or load and unload tang 18 may be made of a plastic material.

An insulation coating 20 (only partially shown) overlays a portion of the load beam 12. A portion (not shown) of insulation coating 20 is sandwiched between load beam 12 and cover 16.

The insulation coating 20 may be made of, for example, a thermoplastic material that is easily deformable when heated. Preferably, insulation coating 20 is a thermoplastic adhesive so that insulation coating 20 may be adhesively applied to load beam 12. More preferably, insulation coating 20 is a visco-elastic thermoplastic adhesive. For example, insulation coating 20 may be made of a high temperature polyester plastic adhesive such as 34F available from 3M Corporation in Saint Paul, Minn. or Scotchdamp brand SJ2010 viscoelastic polymers available from 3M Corporation in Saint Paul, Minn.

Though it is preferable that insulation coating 20 is an insulating material to help prevent electrical wiring 22 from shorting, coating 20 may instead be a conducting material that is also preferably a thermoplastic material, more preferably a thermoplastic adhesive or still more preferably a visco-elastic thermoplastic adhesive.

Alternatively, a separate adhesive may be used to adhere insulation coating 20 to load beam 12 by depositing the separate adhesive on the surface of either insulation coating 20 or load beam 12.

In order to send and receive signals to and from read/write heads (not shown) in the slider, it is necessary to connect electrical wiring 22 to the read/write heads within the slider. Electrical wiring 22, which includes a plurality of individual head lead wires 24, extends between load beam 12 and cover 16 and is buried in insulation coating 20.

Preferably, electrical wiring 22 is laid across the surface of insulation coating 20, and then insulation coating 20 is heated until it softens, permitting electrical wiring 22 to be forced into insulation coating 20 for retention. Alternatively, electrical wiring 22 may be placed over the load beam 12, after which insulation coating 20 is positioned and heated to retain electrical wiring 22.

Electrical wiring 22 from the controls of data storage disk drive 72 may be routed to the distal end of load beam 12 by any convenient path provided some slack is left in the electrical wiring 22. Preferably, electrical wiring 22 is routed so that electrical wiring 22 lies in a plane substantially parallel to the plane of load beam 12, thereby minimizing the height of electrical wiring 22 over load beam 12. Because electrical wiring is buried in insulation coating 20, electrical wiring 22 is strain relieved so that excessive forces are not exerted through the electrical wiring 22 and to the slider.

The electrical wiring 22 may be retained in a fixed relationship to flexure 14 by placing insulation coating 20 over flexure 14. Alternatively, insulation coating 20 may not be placed over flexure 20 so that electrical wiring 22 freely extends over flexure 14.

For additional strain relief, electrical wiring 22 may be retained in a pad area 26 of insulation coating 20.

Load beam 12 includes locking tangs 28, each projecting in a direction that intersects the longitudinal axis 11 of load beam 12. Cover 16 has side flanges 34 that are directed toward the surface of data storage disk 70. Each flange 34 has an open end slot 30 and a closed end slot 32 positioned to slidably receive a locking tang 28.

Before cover 16 is adhered to load beam 12, cover 16 is slid onto load beam 12 in direction A, i.e., the direction opposite to that in which both load beam 12 and cover 16 narrow, so that locking tangs 28 enter their respective slots 30 and 32. Slots 32 are ramped so that locking tangs 28 are loosely received in slots 32 when sliding begins and is tightly pinched in slots 32 when sliding ends. That is, the width of each slot 32 narrows in the direction in which locking tang 28 slides therein. This provides a rattle-free mechanical fit, at least with respect to vertical motion.

The cover 16 provides several functions, including load/unload capability via load and unload tang 18, it acts as a constraining layer which makes insulation coating 20 an effective damper, and it adds rigidity to head suspension assembly 10 via side flanges 34.

FIGS. 2A–2D are top views of the head suspension assembly 10 in various stages of assembly to illustrate a method of fabricating a head suspension assembly 10.

Figure 2A:
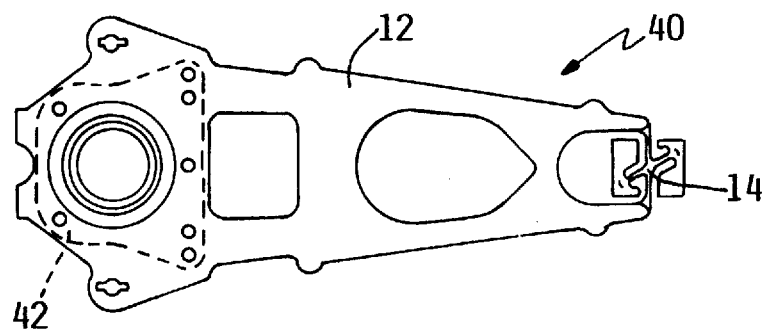
FIGS. 2A–2D are top views of the head suspension assembly shown FIG. 1 in various stages of assembly to illustrate a method of fabrication according to the present invention.

FIG. 2A is a top view of a suspension weldment 40 that may be made, for example, by laser welding a stamped stainless steel mount plate 42 to an etched stainless steel load beam 12 having an integrally formed flexure 14. Alternatively, mount plate 42 may be omitted in favor of direct attachment of load beam 12 to an actuator arm (not shown) by adhesive bonding or welding. Also, load beam 12 may be made by a stamping process if a separately formed flexure 14 is to be welded or adhesively bonded to load beam 12.

Figure 2B:
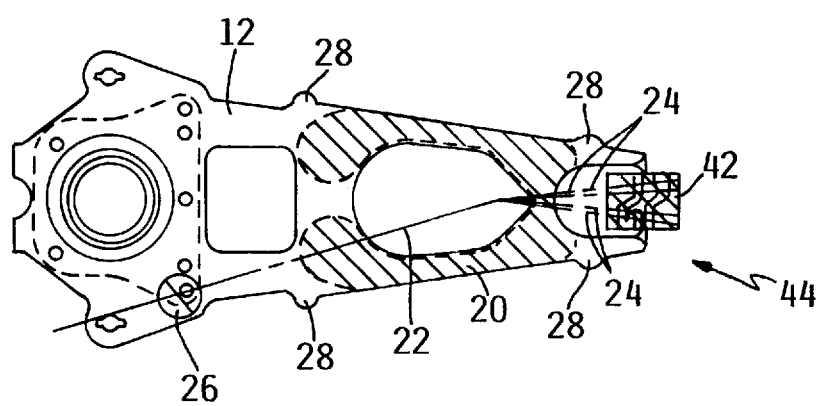

FIG. 2B is a top view of a head suspension subassembly 44. First, insulation coating 20, including pad area 26 and an area 42 for overcoating flexure 14, is applied to load beam 12. Any desired arrangement for insulation coating 20 may be used, with or without pad area 26 and flexure overcoating area 42. Insulation coating 20 may be made from any thermoplastic material such as 34F adhesive available from 3M Corporation is Saint Paul, Minn. This material is desirable because it has good adhesion to both electronic wires and stainless steel, and because it does not outgas any damaging materials when subjected to a disk drive embodiment. Insulation coating 20 must be thick enough to bury electrical wires 22 therein, approximately 0.10 to 0.15 millimeters thick. Insulation coating 20 may be in the form of thermoplastic film decals that are stamped to form a desired shape and then automatically applied to load 18 beam 12 by a robot, for example.

Then electrical wires 22, including individual head lead wires 24, are automatically strung over head suspension subassembly 44 by a robot, for example. Methods and apparatus for automatically stringing head lead wires over a head suspension assembly are well known in the art. A typical example is discussed in U.S. Pat. No. 5,074,029 to Brooks, Jr. et at., hereby incorporated herein by reference. Next, electrical wires 22, including individual head lead wires 24, are pushed down into insulation coating 20 by a heated platen. After electrical wires 22 have been retained in insulation coating 20, individual head lead wires 24 are then stripped of insulation at both ends by an excimer laser, for example, which will remove the insulation without damaging conductors within head lead wires 24.

The slider is then loaded into a toolblock and clamped into a position rotated from its normal position, i.e., so that bonding pads on the side of slider are facing flexure 14. Next, head lead wires 24 are ultrasonically bonded or soldered to the bonding pads on the slider and adhesive is applied to the back surface of the slider. Head suspension subassembly 44 is then rotated so that flexure 14 makes contact with the adhesive coated back surface of the slider, thereby routing head lead wires toward the back of the slider. Finally, the slider bonding adhesive is allowed to cure.

Figure 2C:
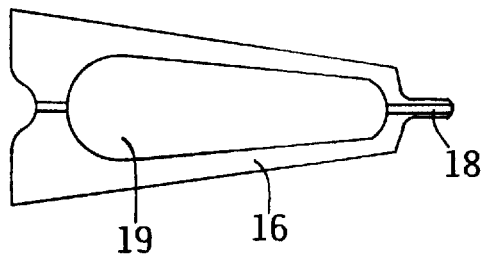

FIG. 2C is a top view of cover 16, before cover 16 is placed on head suspension subassembly 44.

Figure 2D:
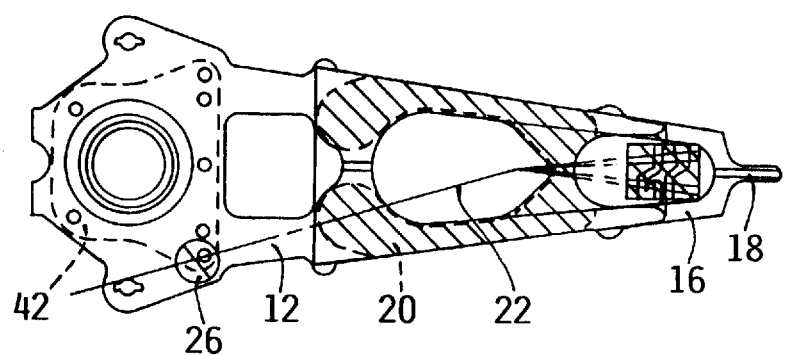

FIG. 2D is a top view of head suspension assembly 10 in a completed state. First, the head suspension subassembly 44 is placed in a fixture which provides solid support under locking tangs 28, but which provides freedom to flex downward elsewhere under load beam 12 and the slider. Next, cover 16 is placed over the top of load beam 12, and then moved back toward mount plate 42 to allow locking tangs 28 to slide into slots 30 and 32 in side flanges 34 of cover 6. A heated platen is then placed over the top of cover 6 to reflow the insulation coating 20 and thereby create a dynamically strong bond between cover 6 and load beam 12, and to further bury electrical wires 22 in insulation coating 20. Finally, head suspension assembly 10 is removed from the fixture.

Figure 3:
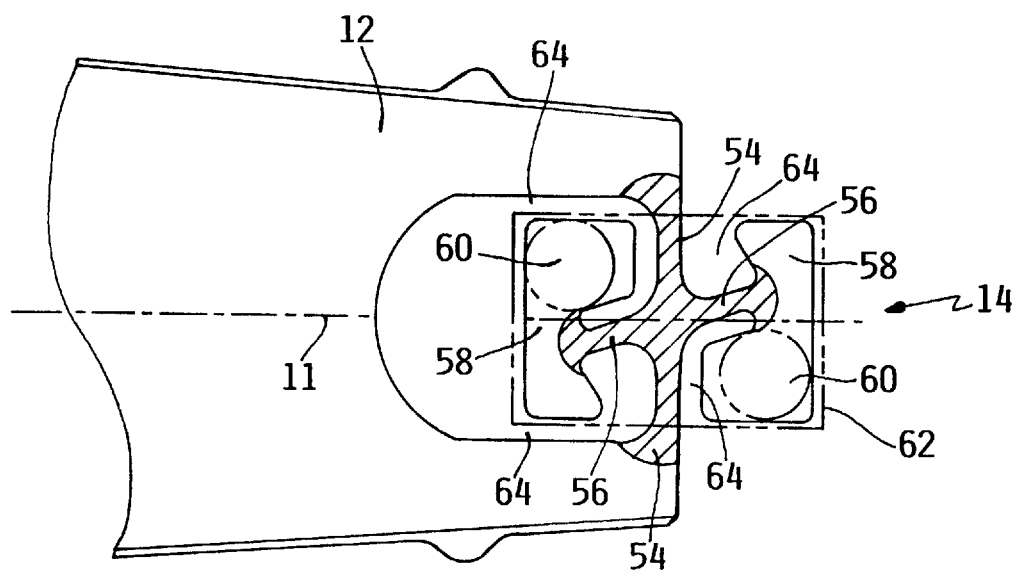
FIG. 3 is a top view of a flexure integrally formed as a part of a load beam of the head suspension assembly shown in FIG. 1.

FIG. 3 is a top view of flexure 14 integrally formed as a part of a load beam 12. Flexure 10 may be formed by removal of the metal surrounding flexure support arms 54, attachment arms 56 and attachment pads 58. Flexure support arms 54 are positioned perpendicular to longitudinal axis 11 of the load beam 12. Attachment arms 56 of flexure 14 are disposed to form an acute angle and an obtuse angle with respect to flexure support arms 54. Each attachment pad 58 provides a zone 60 to facilitate gluing or cementing the attachment pads 58 to a slider 62, the outline of which is shown in phantom line. Clue or cement may be deposited at zones 60.

The formation of the flexure arms 54 and 56 is accomplished by an etching process where the portions of the metal to be preserved are masked, and the load beam 12 is submerged in or sprayed with a suitable liquid, such as ferric chloride, for the chemical removal of metal in unmasked areas.

The removal of metal from regions 64 forms the attachment pads 58 and the flexure arms 54 and 56. Flexure arms 54 and 56 then are additionally etched to reduce the thickness of the metal to make them more responsive to lesser forces exerted thereon by the slider 62 during its flight over the surface of a data storage disk 70 (shown in FIG. 4), within a data storage disk drive 72. Data storage disk 70 may be a magnetic disk, for example.

The flexure arms 54 and 56 may be etched from both sides of the metal stock forming load beam 12 or may be selectively etched from only a single side, as desired. After etching of the flexure arms 54 and 56, the remaining thickness can be as little as 0.025 millimeters.

It is important in the formation of the flexure arms 54 and 56 that a substantial length of the flexure arms 54 and 56 be uniform in thickness and width so as to not unduly concentrate stressed within the flexure arms 54 and 56 during movement of the attachment pads 58 in response to pitch and roll of the slider 62 during flight over the data storage disk 70.

Alternatively, flexure 14 may be manufactured separately from load beam 12, and then welded to the distal end of load beam 12. The cruciform portion of such a separately manufactured flexure 14 may be etched from one side or both sides of the sheet stock from which is formed. Etching from a single side will permit maximum clearance obtainable between the cruciform portion of flexure 14 and the slider 62 when assembled.

Figure 4:
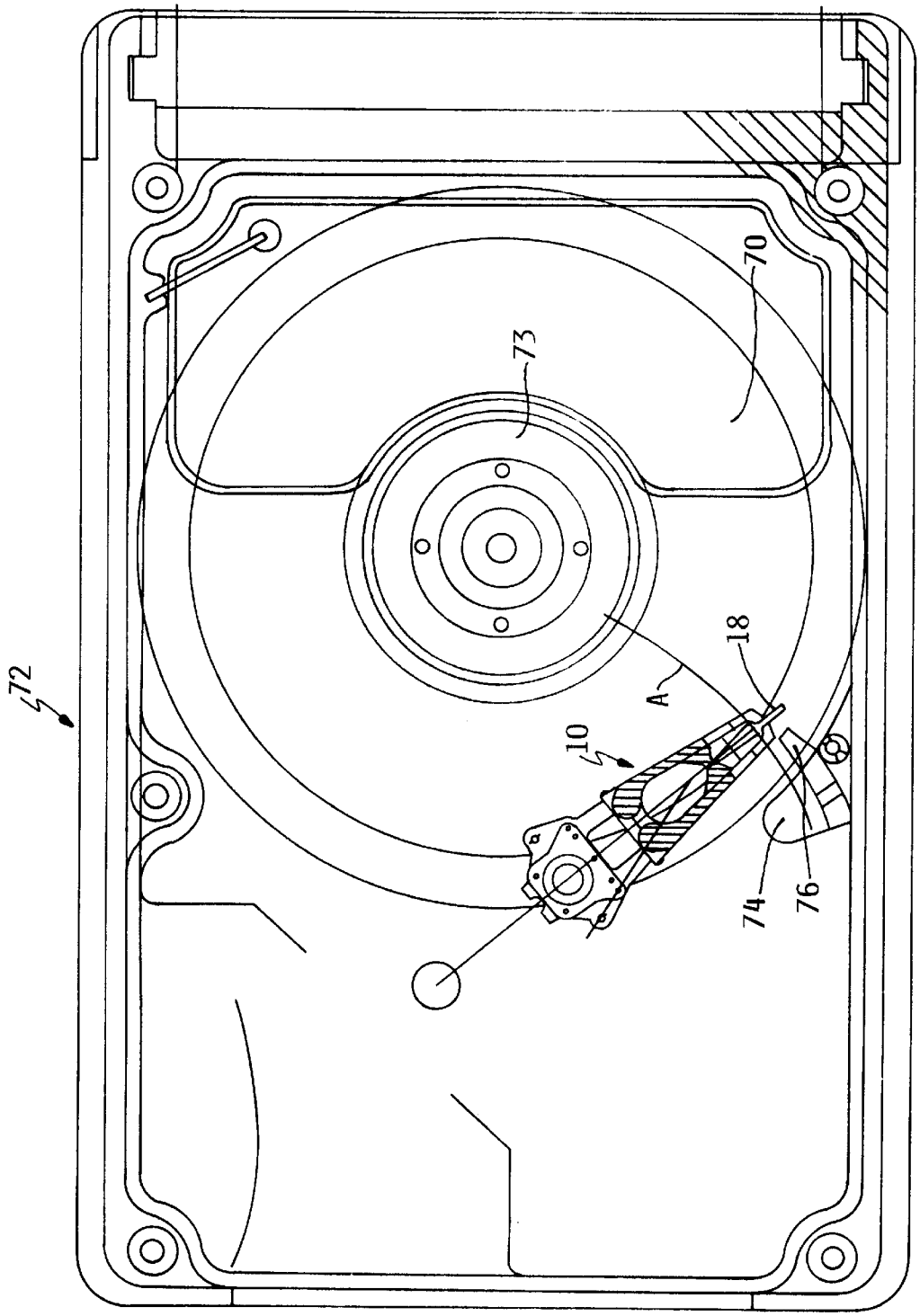
FIG. 4 is a top view of a data storage disk drive incorporating the head suspension assembly shown in FIG. 1.

FIG. 4 is a top view of a data storage disk drive 72 incorporating head suspension assembly 10. The cover associated with data storage disk drive 72 is not shown for clarity. A spin motor (not shown) is connected to data storage disk 70 by a hub 73 to rotate data storage disk 70 at high speed. Head suspension assembly 10 is mounted on an arm (not shown) of an actuator motor (not shown), thereby forming an actuator. The actuator motor moves head suspension assembly 10 relative to data storage disk 70 so that the head moves along an arc A, which extends substantially along a radius of data storage disk 70 and over a slider air bearing surface protection blade 74. Load and unload tang 18 is engagable with a load and unload ramp 76, which is located adjacent to protection blade 74 on the outside diameter of data storage disk 70.

Figure 5:
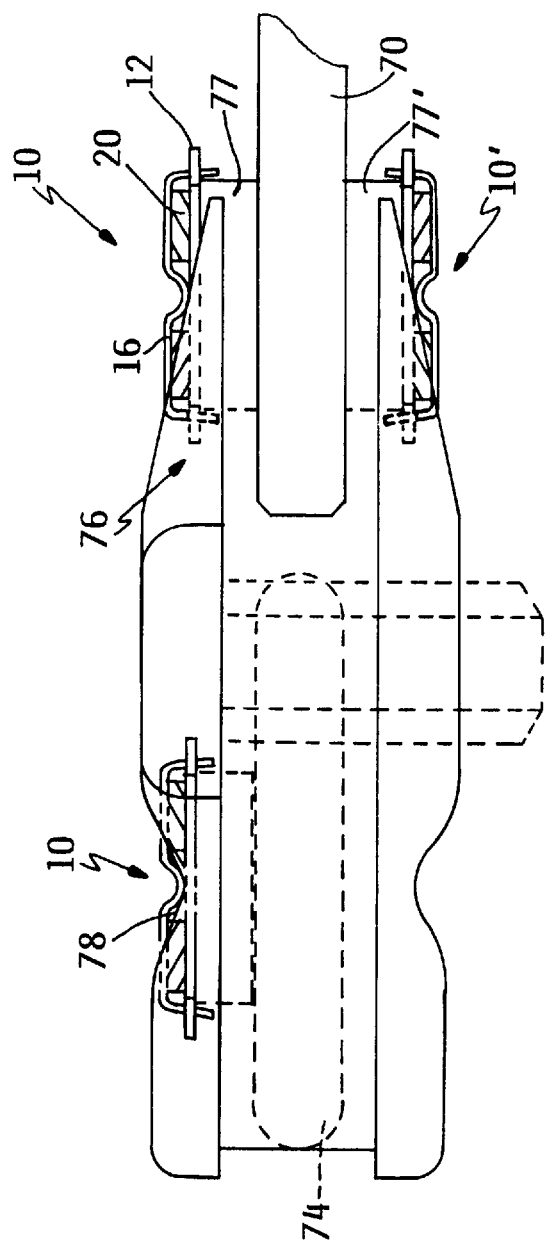
FIG. 5 is an end view of the head suspension assembly shown in FIG. 1 in contact with a load and unload ramp.

FIG. 5 is an end view of head suspension assembly 10 in contact with load and unload ramp 76. Head suspension assembly 10 is shown with slider 77 in contact with data storage disk 70 as it would be during the start of the unload cycle and the end of the load cycle. A second head suspension assembly 10' is shown on the opposite side of data storage disk 70, and is identical to head suspension assembly 10. Head suspension assembly 10 is also shown in phantom lines in a ramp detent position as it would be when the data storage disk drive 72 is not in operation. When the head suspension assembly 10 is in the ramp detent position, the load and unload tang 18 is in a detent 78 of load and unload ramp 76. Detent 78 helps to prevent the actuator from moving in case data storage disk drive 72 is dropped on one of its corners or is subjected to other rotational shocks. Detent also positions slider 77 over air bearing surface protection blade 74 which may be used to prevent flexure damage and/or air bearing surface damage due to slider/ slider impact during vertical shock loads. Alternatively, protection blade 74 may be omitted if, for example, a load arm having an integral flexure is used, in which case large excursions of the slider away from the load beam during mechanical shock loads are inherently prevented.

The locking tangs 28 on load beam 12 and slots 30 and 32 in each side flange 34 of cover 16 are shaped to provide a rattle-free fit for vertical motion. The spacing between open end slot 30 and closed end slot 32 in each side flange 34 of cover 16 and the spacing between locking tangs 28 inserted therein is preferably arranged so that locking tangs 28 register against the ends of closed end slots 32 but do not register against the end of open end slots 30 when cover 16 is slid to its final position relative to load beam 12. Because the two locking tangs 28 in closed end slots 32 are thusly guaranteed to be registered against the end of closed end slots 32, those two locking tangs 28 are available to help resist the dynamic loading coming from moving load and unload tang 18 onto and off load and unload ramp 76. The insulation coating 20 provides additional resistance to the dynamic loading coming from moving load and unload tang 18 onto and off load and unload ramp 76. The locking tangs 28 on the load beam 12 and slots 30 and 32 in each side flange of cover 16 also provide the static strength which is needed while load and unload tang 18 is parked on load and unload ramp 76.

The load beam 12 shown in FIG. 2A may be modified to provide additional stiffness. For example, a rib and/or a flange may be placed along the sides of load beam 12 between locking tangs 28 to provide reinforcement, and/or the length of locking tangs 28 may be made longer to have a greater contact area with cover 16.

Figure 6A:
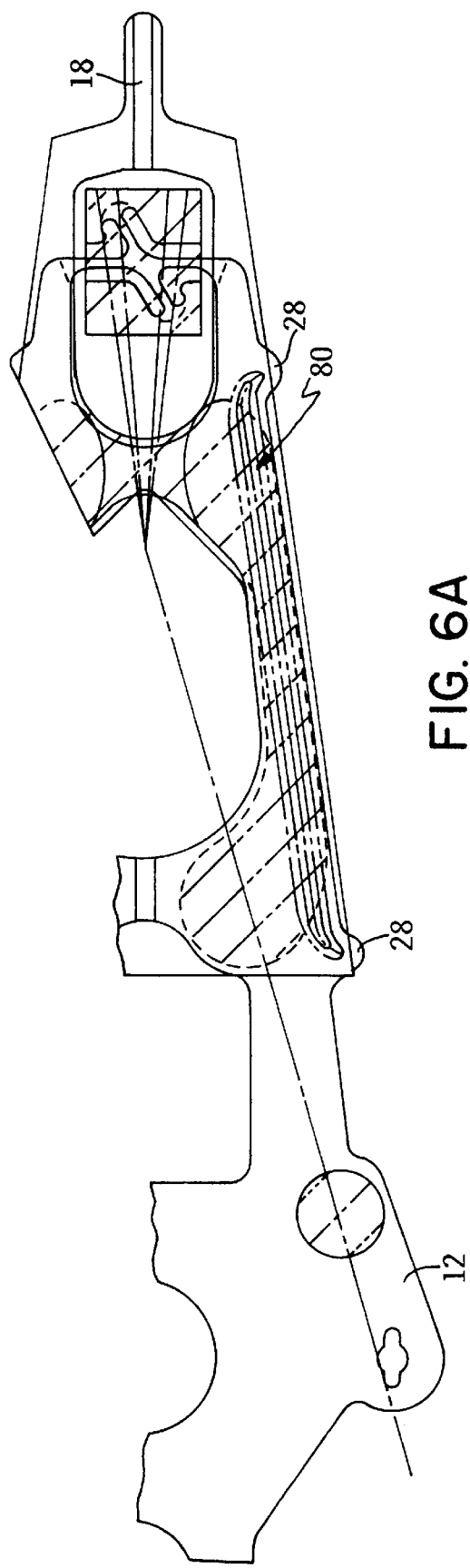
FIG. 6A is a partial top view of a first modification of the head suspension assembly shown in FIG. 1 having a stiffening rib in the load beam.
Figure 6B:
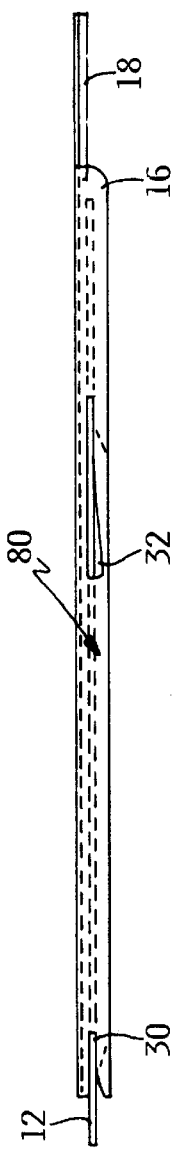
FIG. 6B is a side view of the modified head suspension assembly shown in FIG. 6A.
Figure 6C:
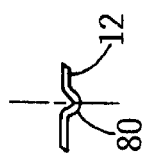
FIG. 6C is a cross-sectional view of the stiffening rib shown in FIG. 6A.

FIGS. 6A and 6B are respectively partial top and side views of a first modification of head suspension assembly 10 having a stiffening rib 80 along the sides of load beam 12 between locking tangs 28. FIG. 6C is a cross-sectional view of stiffening rib 80, which is preferably stamped into load beam 12. Alternatively, a stiffening rib may be etched into or adhered to load beam 12. It is also preferable to direct stiffening rib 80 down toward data storage disk 70 to avoid any tolerance problems with cover 16.

Figure 6D:
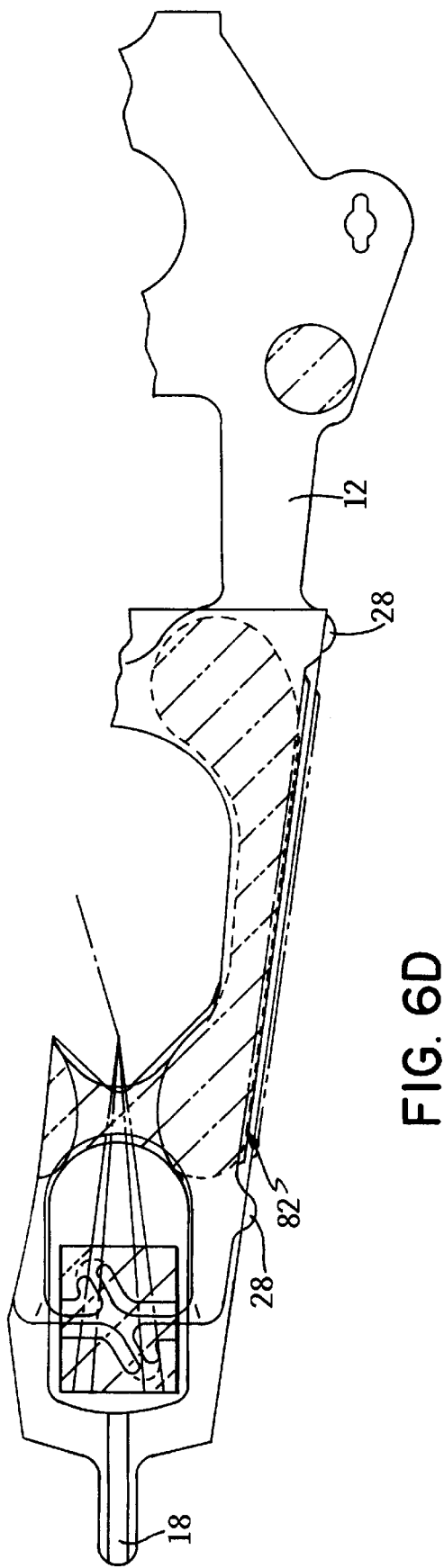
FIG. 6D is a partial top view of a second modification of the head suspension assembly shown in FIG. 1 having a stiffening flange in the load beam.
Figure 6E:
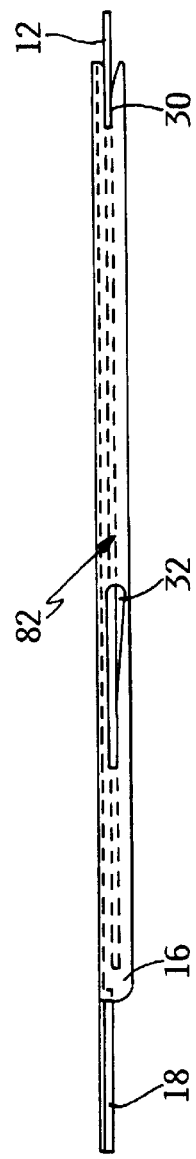
FIG. 6E is a side view of the modified head suspension assembly shown in FIG. 6D.

FIGS. 6D and 6E are respectively partial top and side views of a second modification of head suspension assembly 10 having a stiffening flange 82 along the sides of load beam 12 between locking tangs 28. Stiffening flange 82 is preferably stamped into load beam 12. It is also preferable to direct stiffening flange 82 down toward data storage disk 70 to avoid any tolerance problems with cover 16.

It should be further understood that individual embodiments of the present invention may be incorporated into a head suspension assembly without the inclusion of all of the elements, although a preferred embodiment is to incorporate all of the improvements in a single head suspension assembly. It should be further understood that minor changes and modifications in the described devices and methods may be made without departing from the scope of the present invention described in the attached claims, inasmuch as the description and drawings are only illustrative.

What is claimed is:

1. A head suspension assembly for use in a data storage disk drive having a load and unload ramp, comprising:

a load beam having a first and a second end, said first end of said load beam being adapted for operable connection to an actuator motor, said load beam further including side edges each having a locking tang projecting in a direction that intersects a longitudinal axis extending from said first end to said second end of said load beam;

a flexure supported at said second end of said load beam, said flexure being adapted for receiving a slider; and a cover attached to said load beam, wherein said cover has a load and unload tang projecting beyond said load beam so as to be engagable with said load and unload ramp, said cover including flanges respectively extending along said side edges of said load beam, said flanges each including a slot for receiving said locking tang projecting from a respective one of said side edges of said load beam, wherein each of said locking tangs extends through a respective one of said slots of said cover.

2. The head suspension assembly of claim 1 further comprising a visco-plastic coating overlaying at least a portion of said load beam to provide damping wherein a first portion of said visco-plastic coating is sandwiched between the cover and load beam.

3. The head suspension assembly of claim 2 further comprising a head lead wire extending through said first portion of said visco-elastic coating.

4. A head suspension assembly for use in a data storage disk drive having a load and unload ramp, comprising:
a load beam having:
a first end and a second end wherein said first end is operably connectable to an actuator motor,
a left and a right support member extending from said first end to said second end of said load beam, said left and right support members each including an outside edge having a locking tang projecting in a direction that intersects a longitudinal axis extending from said first end to said second end of said load beam,
an aperture located in a central portion of said load beam, and
a gap located in between said left and right support members at said second end of said load beam;
a flexure located within said gap;
a cover attached to said load beam, wherein said cover has a load and unload tang projecting beyond said load beam so as to be engagable with said load and unload ramp, said cover including a plurality of slots each receiving a respective one of the locking tangs of said left and right support members; and
a visco-elastic coating overlaying a portion of said load beam wherein some of said viscoelastic coating is sandwiched between said cover and said load beam.

5. The head suspension assembly of claim 4 wherein said cover includes an opening that exposes said aperture and said gap.

6. The head suspension assembly of claim 5 wherein a head lead wire extends across said aperture in said load beam.

7. The head suspension assembly of claim 4 further comprising a head lead wire extending through a first portion of said visco-elastic coating.

8. The head suspension assembly of claim 4 wherein said visco-elastic coating is an insulative coating.

9. The head suspension assembly of claim 8 wherein said insulative coating is a thermoplastic adhesive.

10. The head suspension assembly of claim 9 wherein said thermoplastic adhesive is a polyester.

11. The head suspension assembly of claim 8 wherein said cover is a stainless steel having a thickness of about 1 mil and said insulative coating has a thickness of about 0.10 to 0.15 mils.

* * * * *

UNITED STATES PATENT AND TRADEMARK OFFICE
CERTIFICATE OF CORRECTION

PATENT NO. : 5,875,072
DATED : February 23, 1999
INVENTOR(S) : William Woodrow Brooks, Jr.; Jeffrey Bernard Brown; Jerome Thomas Coffey; Donald John Wanek It is certified that error appears in the above-identified patent and that said Letters Patent is hereby corrected as shown below:

Claim 2, Col. 8, Line 61, "visco-plastic" should be --visco-elastic--.

Claim 2, Col. 8, Line 63, "visco-plastic" should be --visco-elastic--.

Claim 6, Col. 10, Line 7, "a" should be --said--.

Claim 7, Col. 10, Line 11, second "a" should be --said--.

Signed and Sealed this

Twenty-ninth Day of June, 1999

Attest:

Q. TODD DICKINSON

*Attesting Officer*     Acting Commissioner of Patents and Trademarks